(12) United States Patent
Vogel et al.

(10) Patent No.: US 6,578,416 B1
(45) Date of Patent: Jun. 17, 2003

(54) FUEL SYSTEM

(75) Inventors: Steven M. Vogel, Chesterfield, MO (US); John A. Sturm, Manchester, MO (US); Andrew M. Matulek, Beauford, MO (US); Clayton R. Mason, Decorah, IA (US); William C. Wolffe, Valley Forge, PA (US)

(73) Assignees: Labarge, Inc., St. Louis, MO (US); GDM, Inc., St. Louis, MO (US)

( * ) Notice: Subject to any disclaimer, the term of this patent is extended or adjusted under 35 U.S.C. 154(b) by 0 days.

(21) Appl. No.: 09/658,755

(22) Filed: Sep. 8, 2000

Related U.S. Application Data
(60) Provisional application No. 60/153,019, filed on Sep. 9, 1999.

(51) Int. Cl.[7] ............................................. G01F 23/00
(52) U.S. Cl. .................... 73/304 C; 73/290 R
(58) Field of Search .................. 340/620; 73/304 C, 73/304 R (56) References Cited

U.S. PATENT DOCUMENTS

| | | |
|---|---|---|
| 5,138,880 A | 8/1992 | Lee et al. |
| 5,423,214 A | 6/1995 | Lee |
| 5,747,689 A | 5/1998 | Hampo et al. |
| 5,860,316 A | 1/1999 | Berrill |
| 6,164,132 A * | 12/2000 | Matulek .................. 73/304 C |

* cited by examiner

Primary Examiner—Helen Kwok
Assistant Examiner—Rodney Frank
(74) Attorney, Agent, or Firm—Grossman, Tucker, Peffeault & Pfleger, PLLC

(57) ABSTRACT

A self-compensating fluid level sensor is described, including a dual array of capacitive sensors on a dielectric substrate, the dual array of sensors forming multiple sensor pairs. Multiple signal detection circuits including comparators are configured to compare the capacitance of a first sensor pair with a second sensor pair. The internal capacitance comparisons allow the fluid level sensor to compensate for variations in the dielectric of the fluid being measured, as well as for manufacturing and materials variations that affect capacitive sensing. The passive level sensor also provides a platform for providing additional circuitry for providing additional information regarding the liquid, such as liquid composition.

29 Claims, 8 Drawing Sheets

FUEL SYSTEM

CROSS REFERENCE TO RELATED APPLICATIONS

This application claims the benefit of prior provisional U.S. patent application Ser. No. 60/153,019, filed Sep. 9, 1999.

BACKGROUND OF THE INVENTION

This invention relates generally to electronic indicators and more particularly, to a self-compensating fuel system for measuring fluid level and additional properties of a fuel in which the indicator is submerged.

Liquid level indicators are widely used in a variety of applications, including, for example, vehicle fuel tanks. Such indicators generally provide information on the volume of a liquid, for example fuel, remaining in a container such as a fuel tank. Known fuel level indicators include mechanical indicators such as those commonly used in toilet tanks, and more modern, passive capacitive electronic indicators which typically operate by sensing the effect of the dielectric property of a fuel on capacitance when the indicator is partly submerged in the fuel. Electronic sensors submerged in the fuel generate signals to an electronic circuit, which, in turn, provides an indication of the fuel level. Generally, the electronic indicators have potentially greater accuracy for level indication than the older, mechanical type, and electronic indicators are less costly to manufacture.

However, though electronic indicators are more desirable to manufacturers and consumers alike, the art has struggled to provide electronic indicators which are both reliable and accurate. More recently a capacitive liquid level indicator as described in U.S. patent application Ser. No. 09/145,675, filed Sep. 2, 1998, which is herein incorporated by reference, has been developed and is thought to have improved accuracy and reliability relative to other known capacitive indicators. The capacitive electronic liquid level indicator includes a dual array of capacitive sensors on a dielectric substrate, and is believed to provide improved accuracy and reliability over other known capacitive liquid level indicators by reducing the effects of lead capacitance and trans-substrate parasitic electric fields.

However, the known capacitive liquid level indicators, including that described in U.S. patent application ser. No. 09/145,675 are still limited. Known capacitive liquid level indicator have sensor pads of capacitor plates arranged in horizontal orientation with respect to the level of liquid being measured. Such an arrangement limits the accuracy of fuel level detection. Further, known capacitive level sensors do not take into account multiple factors that affect the reliability of the level measurement. Specifically, variations in the dielectrics of known fuels, the effect of temperature on the dielectric of a fuel, physical tolerances of the materials used, and manufacturing process variations all affect the accuracy and reliability of such capacitive sensors. For example, varying trace widths, variations in the dielectric of the substrate material, moisture in the substrate material, are all variables which affect the readings of such sensors.

Still further, known capacitive sensors are limited to providing only an indicator of liquid level. Additional, useful information pertaining to the liquid is not made available. This is a particular problem with liquid fuel in a vehicle fuel tank. Additional information on the current conditions and properties of the fuel would be extremely useful for improving the safety and efficiency of vehicle operation. For example, known capacitive liquid level indicators do not provide information on the chemical composition of the liquid. With the increased availability and use of chemical and mixed fuels such as flex-fuel, a vehicle operator may know the overall fuel level in the tank but not the relative amounts of the chemical components of the fuel. In addition, to avoid or avert freezing, it is useful for a vehicle operator to know the water content of a fuel. To assure the proper grade of gasoline actually delivered into tank, vehicle operators need to obtain an octane reading of the gasoline. Further, internal tank pressure as a measure of fuel vapor pressure within a tank would be useful for safety reasons. In addition, known capacitive liquid level indicators do not provide any external signals to actuate or control other devices, such as a fuel pump or a burglar alarm, in response to changing properties or conditions of the liquid.

Accordingly it would be desirable to provide a self-compensating capacitive fuel system that compensates for variations in the dielectric of the fluid being measured, as well as manufacturing variations, thus providing improved accuracy and reliability over known capacitive level sensors. It would also be desirable to provide a fuel system that provides both fuel level information and additional information on properties of a liquid fuel being measured. It would also be desirable to provide a fuel system that can provide information on the chemical composition of the fuel, including the water content, octane level of a gasoline, and ethanol content of a flex-fuel. It would be further desirable to provide a fuel system that provides signals to actuate or control other devices in response to changes in the fuel. It would be still further desirable to provide a fuel system that provides information on the internal pressure of a tank containing the fuel.

BRIEF SUMMARY OF THE INVENTION

In an exemplary embodiment, a self-compensating fuel system includes a dual array of multiple capacitive sensors on a dielectric substrate, the dual array of capacitive sensors forming multiple sensor pairs. At least one signal detection circuit is further included, each signal detection circuit coupled to a first sensor pair and a second sensor pair. Thus, the fuel system includes at least two sensor pairs. In an exemplary embodiment the system includes more than two sensor pairs and mutiple signal detection circuits, each circuit coupled to a first and a second sensor pair. The signal detection circuits each include a comparator configured to compare the capacitance of the first sensor pair with the capacitance of said second sensor pair. By internally comparing the capacitance of the first sensor pair with the capacitance of the second sensor pair, the fuel system compensates for variations in the dielectric of the fluid being measured, as well as manufacturing and materials variations.

For example, the fuel system compensates in its fluid level indication for variables such as temperature and fluid composition that affect the accuracy and reliability of capacitive sensor readings. In alternative embodiments, the fuel system, by virtue of its passive electronic operation, provides a platform for providing additional circuitry for controlling other devices on a vehicle. The additional circuitry may be stand-alone, or may use the capacitive information provided by the sensors.

Each sensor pair corresponds to a discrete fluid level output, and so the number of sensor pairs is typically about six or eight, but can be much higher depending on the desired number of level indicator levels. One embodiment includes, for example, sixteen sensor pairs corresponding to sixteen levels. For large vehicles with large fuel tanks, greater numbers of sensor pairs are especially suitable. In an exemplary embodiment, the first sensor pair are positioned in staggered relation relative to one another so that at least one other, or third sensor pair is positioned between said first sensor pair and said second sensor pair. In another embodiment, the first sensor pair and second sensor pair are positioned immediately adjacent to one another. However, other relative positions of the first sensor and second sensor pair are possible.

To drive output devices using the signals from the sensors and signal detection circuits, the fuel system further includes a signal conditioning circuit for receiving the inputs from the signal detection circuit. The signal conditioning circuit is configured to drive at least one output device, including for example a fuel gauge for indicating fuel level to a vehicle driver. In one embodiment the signal conditioning circuit is configured to drive multiple output devices, including for example a fuel pump speed control and a fuel composition analysis circuit. Alternatively, fuel pump speed control circuitry and fuel composition analysis circuitry is stand-alone on the dielectric substrate.

In one embodiment, the fuel system includes a microcontroller or microprocessor, and the fuel composition analysis circuit. The fuel composition analysis circuit includes for example an electronic drive circuit, a complex impedance detection circuit, an electrochemical potentiostat and a temperature detector coupled in parallel, each configured to receive an input from a designated sensor pair and to provide an output to the microcontroller. The microcontroller is configured to analyze the outputs to determine the chemical composition of a fuel in contact with the fluid level sensor.

More specifically, the analysis circuit is configured to sense the chemical composition of the fuel by combining complex impedance measurements with temperature information, or to sense a change in the dielectric of the fuel as the concentration of a particular component of the fuel varies. The circuit is thus configured to sense, for example, the alcohol, water or octane concentration in gasoline or the layering of one liquid over another such as, for example, oil over water. In one embodiment, for example, the fuel composition analysis circuit is configured for signaling at least an alcohol content, such as the ethanol content, of the fuel. In another embodiment, the fuel composition analysis circuit is configured for signaling the water content of the fuel. In yet another embodiment, the fuel composition analysis circuit is configured for signaling at the octane rating of the fuel. The internal comparison of capacitance between the first sensor pair and second sensor pair provides a varying reference that is calibrated to the dielectric of the liquid being measured and thus compensates for variation in materials and manufacturing process. Further, by virtue of its passive operation, the fuel system provides a platform suitable for adding a range of electronic functions especially useful with respect to using and analyzing fuel in a vehicle. Such functions include the analysis of fuel chemical composition, fuel pump speed control, and the like. In alternative embodiments, additional electronic components include, for example, a temperature sensor, a hydrophone for sensing motion of the liquid, and a pressure sensor for sensing tank pressure. Such additional components are mounted or embedded in the substrate. In addition, the dielectric substrate may be flexible so that the sensors and additional components form a flexible circuit that can conform to the shape of a fuel delivery module or a fuel tank.

The fuel system is thus a passive, capacitive level sensor that self-compensates for changes in the dielectric of the fuel being measured, as well as materials and manufacturing process variations. In addition, the fuel system provides a range of information on the properties and conditions of a liquid fuel in a tank, including fuel level, fuel composition and quality, internal tank pressure, fuel temperature, and fuel movement while the car is unoccupied. Specifically, the fuel system provides information on the chemical composition of the fuel, including the water content, octane level of a gasoline, and ethanol content of a flex-fuel. The fuel system further provides output signals to actuate or control other vehicle devices in response to changes in the fuel or the tank.

DETAILED DESCRIPTION OF THE INVENTION

Figure 1:
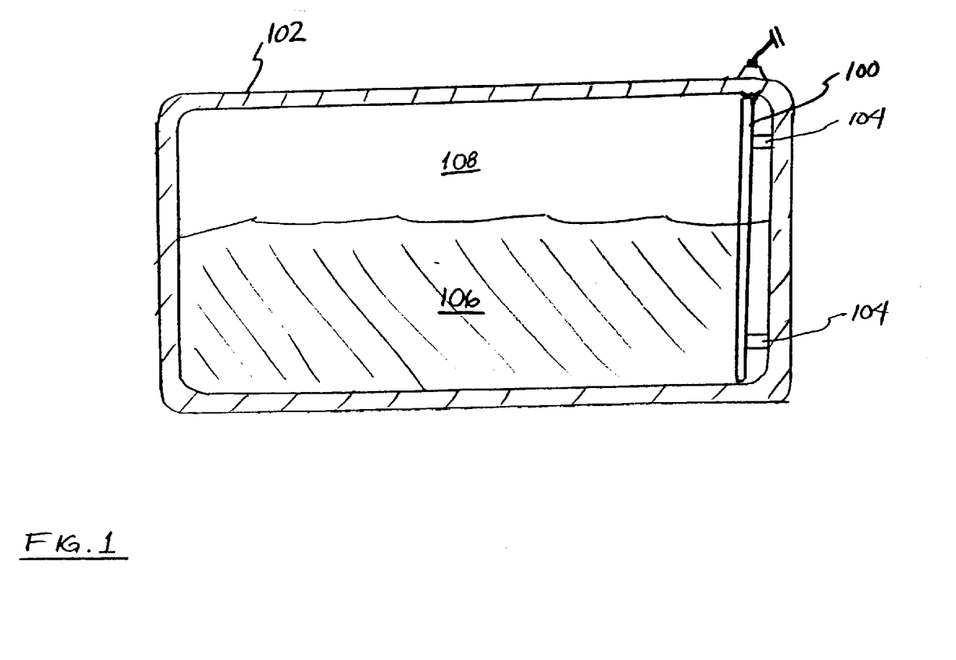
FIG. 1 is a sectional side view of a fuel tank containing a liquid fuel, wherein the properties of the liquid are being sensed by a fuel system.

FIG. 1 is a partly sectional side view of a tank showing a fuel system 100 in a typical environment of operation, in a vehicle fuel tank 102. Fuel system 100 generally includes a plurality of sensors, at least one microcontroller, and additional components and associated circuitry on a printed circuit (PC) board. The sensors, microcontroller, components and circuitry are configured to provide self-compensating capacitive fuel level sensing, as well as a range of information on the current properties or conditions of a liquid fuel within a tank. Additionally, fuel system 100 may include circuitry for controlling other devices on a vehicle.

In an exemplary embodiment, fuel system 100 is a capacitive indicator including a dual capacitive sensor array, as described further below. Fuel system 100 can be connected to the interior of tank 102 by any known fastener means, such as stand-offs 104, or in the case of automotive gasoline tanks, to the fuel pump bracket assembly or the fuel delivery module. A liquid fuel 106 is contained in tank 104. Above liquid 106 is a gas 108 or gas composition, such as air. Fuel system 100 senses fuel level by sensing the portion of fuel system 100 which is submerged in liquid 106, and the portion thereof which is emerged from liquid 106, and in gas 108. In one embodiment, fuel system 100 further senses the chemical composition of fuel 106. Fuel system 100 then provides output signals to a gauge or other indicating device (not shown) to indicate to a user the fuel level. When circuitry for sensing chemical composition is included, fuel system further provides output signals to an indicator device indicating chemical composition. In one alternative embodiment, fuel system also provides output signals to control devices (not shown in FIG. 1) such as the fuel pump speed control in a vehicle engine, which are responsive to information including fuel level and chemical composition information.

Figure 2:
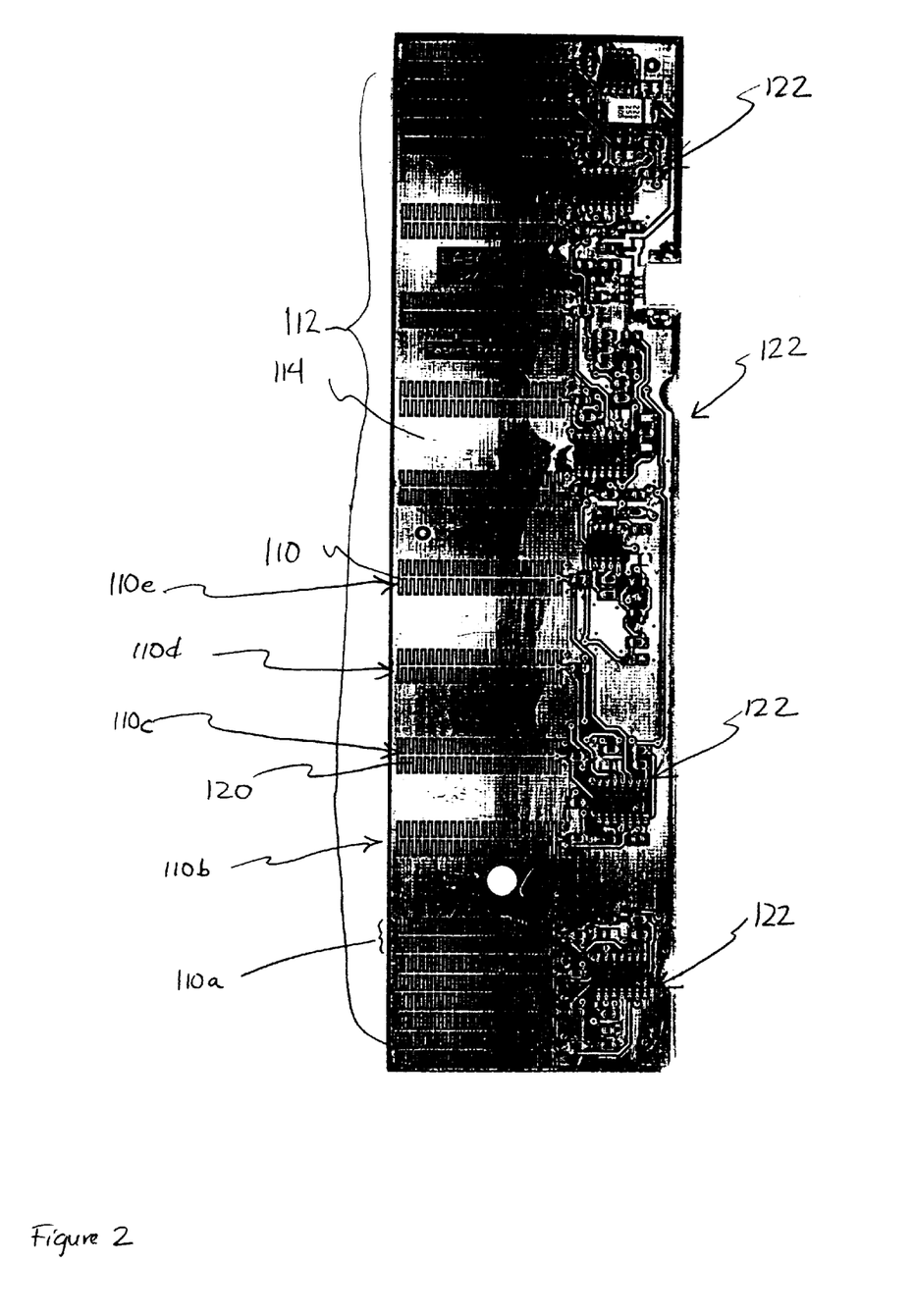
FIG. 2 is a plan view of a front surface of an exemplary embodiment of the fuel system.

FIG. 2 is a plan view of a front surface of fuel system 100 according to an exemplary embodiment. Fuel system 100 includes a plurality of capacitive sensors 110, or sensor pads, arranged in an array 112 and affixed externally to a front surface of a dielectric substrate 114. Array 112 also includes, as shown in the rear view of system 100 in FIG. 3, a second capacitive sensor array 116 affixed externally to a rear surface of dielectric substrate 114. Capacitive sensors 110 each have a plurality of interdigitated fingers 120. Fingers 120 are oriented substantially vertically as shown in FIG. 2, or alternatively are arranged substantially horizontally. First capacitive sensor array 112 and second capacitive sensor array 116 are arranged in spaced relation on opposing surfaces of substrate 114, to one side of dielectric substrate 114, so that capacitive sensors 110 form sensor pairs across opposing surfaces of substrate 114. Sensor arrays 112 and 116 are essentially identical, and the sensors 110 of first capacitive sensor array 112 and second capacitive sensor array 116 are superposed with respect to each other and connected in parallel. A plurality of sensor signal detection circuits 122 are positioned along one side of the front surface of substrate 114, adjacent the capacitive sensor pairs and affixed to substrate 114, wherein it is expected that circuits 122 will be submerged, along with the capacitive sensor pairs, in the fuel to be sensed.

Referring again to FIG. 1, the capacitive sensor pairs are exposable to fuel 106 or gas 108 thereabove. An oscillating voltage is applied to each capacitive sensor pair, which voltage causes a sensing electric field to be generated between adjacent and oppositely polarized fingers 120. The dielectric constant of liquid 106 is greater than the dielectric constant of gas 108, whereupon the sensing electric field has two aspects: the sensing electric field in air and the sensing electric field in the liquid fuel (the former being larger than the latter). Accordingly, the capacitance is higher in liquid 106 than it is in gas 108. Each sensor signal detection circuit 122 detects the difference in capacitance of each capacitive sensor pair due to the change in dielectric constant of the medium in contact with the capacitive sensor pair. Circuits 122 send outputs to a signal conditioning circuit as described below, which provides an output signal to at least one output device such as a gauge. Parasitic electric fields are very small inside the substrate because superposed sensors 110 have like polarity. Further, it is believed that the magnitude of trans-substrate parasitic electric fields can be disregarded because the fields are vanishingly small when compared to the sensing electric field.

In one embodiment, circuits 122 are configured to compare the capacitance of adjacent pairs of sensors 110 so that fuel system self-compensates using a varying reference which changes according the substrate dielectric, substrate thickness, substrate moisture content, substrate trace thickness, coating type and dielectric, coating thickness, component input impedance, temperature and fuel type and dielectric. Particularly, and referring again to FIG. 2, circuits 122 are configured to successively compare pairs of sensors 110. For example, circuits 122 are configured to compare the capacitance of a first sensor pair 110a plus a fixed reference capacitor with a second sensor pair 110b, second sensor pair 110b with third sensor pair 110c, third sensor pair 110c with fourth sensor pair 110d, and so on. Thus, many tolerances and variables are removed or compensated for.

Figure 4:
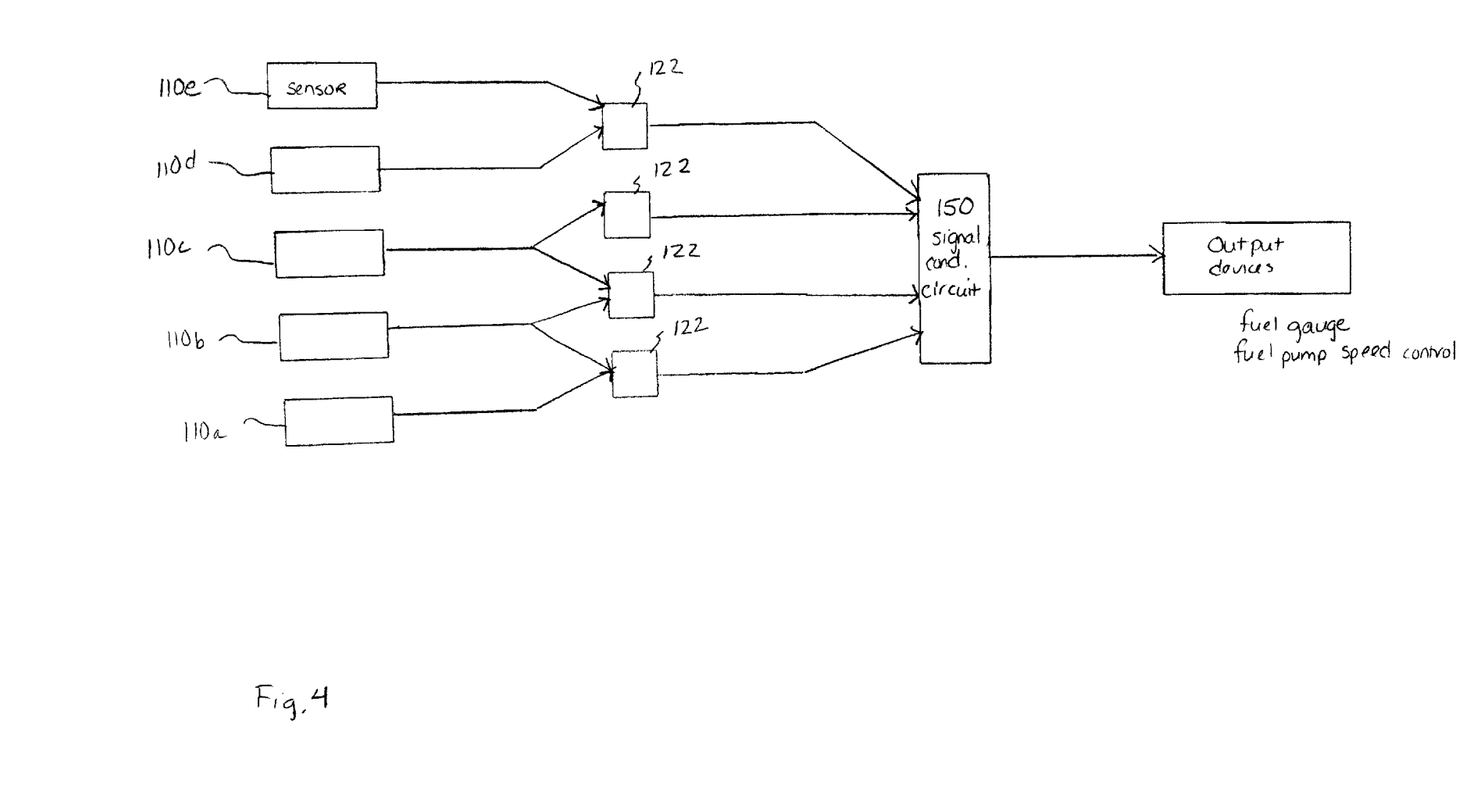
FIG. 4 is a block diagram of an exemplary embodiment of the fuel system.

FIG. 4 is a block diagram of fuel system 100. A signal output from the sensor signal detection circuits 122 is sent to a signal conditioning circuit 150. Conditioning circuit 150 takes the digital signals and provides driving of output devices, such as, for example, a conventional fuel gauge. In addition, conditioning circuit 150 provides output signals to control devices, such as, for example, a fuel pump speed control. Conditioning circuit 150 also includes, for example, circuitry or a microprocessor programmed for providing damping or averaging of the signal detection circuit output. The damping circuitry or microprocessor thus compensating for slosh of liquid fuel within a vehicle tank while the vehicle is moving. This accomplished, for example, using an averaging algorithm such as those using decaying averages. More specifically, and in an exemplary embodiment, conditioning circuit 150 converts the digital signal of comparators in sensor signal detection circuits 122 to a damped analog signal for actuating an output device such as a fuel gauge. A feed back is also provided between the gauge and the conditioning circuit 150. The conditioning circuit also includes, for example, an algorithm for compensating for varying tank geometry. To compensate for varying tank geometry, tank configuration constants are determined for each type of tank to be used. The microprocessor is then provided with the tank configuration constants of the tank in which the fuel system is to be used, and compensates the analog output signal to account for the tank geometry specified by the tank configuration constants.

Figure 5:
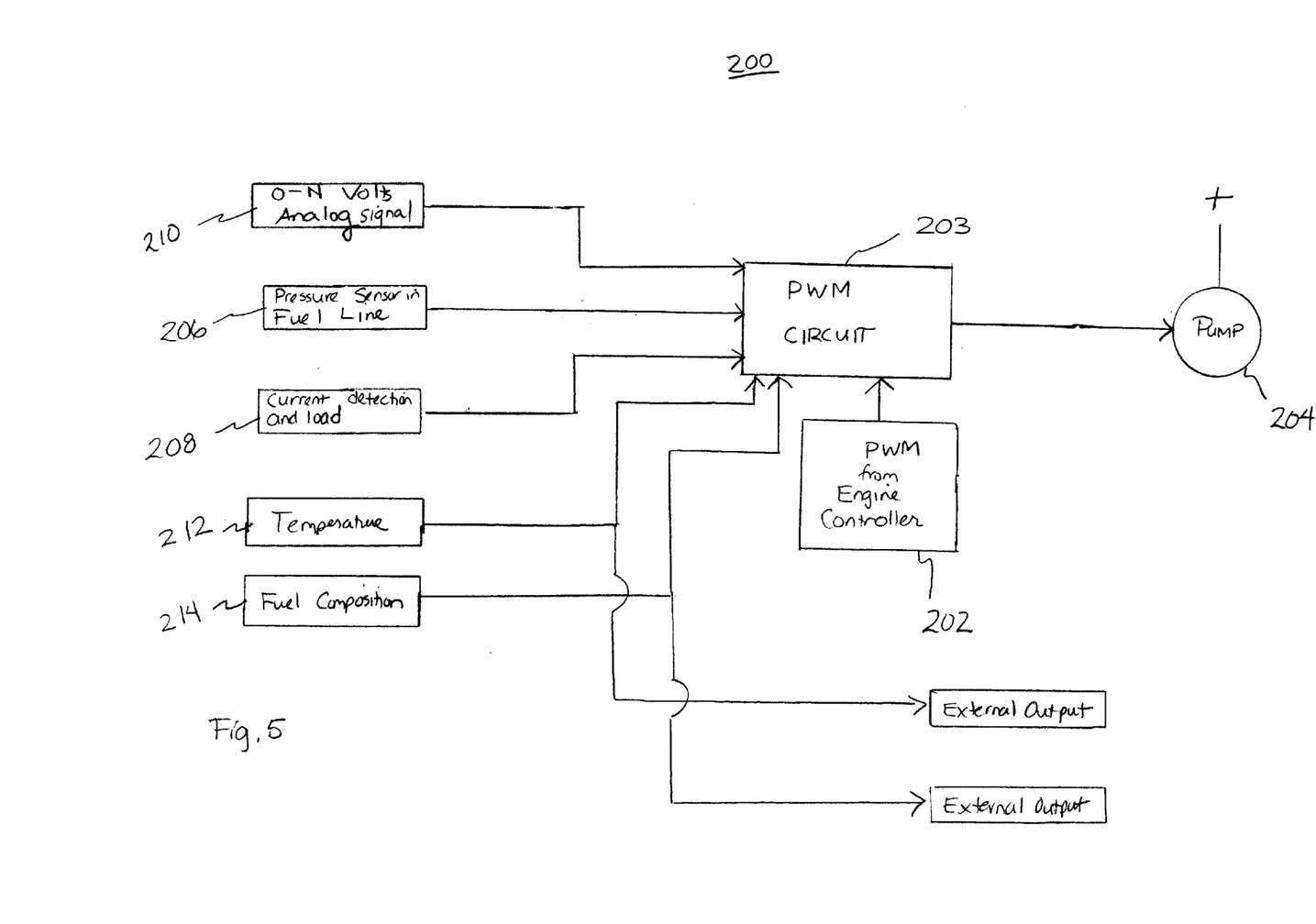
FIG. 5 a block diagram of a fuel pump speed control circuit in one embodiment of the fuel system.

FIG. 5 is a block diagram of a fuel pump speed control 200 circuit in one embodiment of fuel system 100. Fuel pump speed control 200 is either a stand-alone circuit or in one embodiment uses input from the capacitive sensors to regulate fuel pump speed. Fuel pump speed control circuit 200 is also mounted or embedded on substrate 122. In any case, fuel pump speed control circuit 200 uses a pulse width modulated (PWM) drive signal 202 from the vehicle engine as an input to a PWM circuit 203 that controls the speed of a fuel pump motor 204. In one embodiment, PWM circuit 203 also receives and uses any or all inputs from a pressure sensor 206 in the vehicle fuel line, a current detection input 208 from fuel pump motor 208, and a 0-N volts analog signal 210 from the engine controller, or from a sensor such as a vacuum sensor. In one embodiment, additional inputs include, for example, a temperature input 212, and a fuel composition input 214. The inputs are then used by PWM circuit 203 to control the speed of fuel pump 204.

Figure 6:
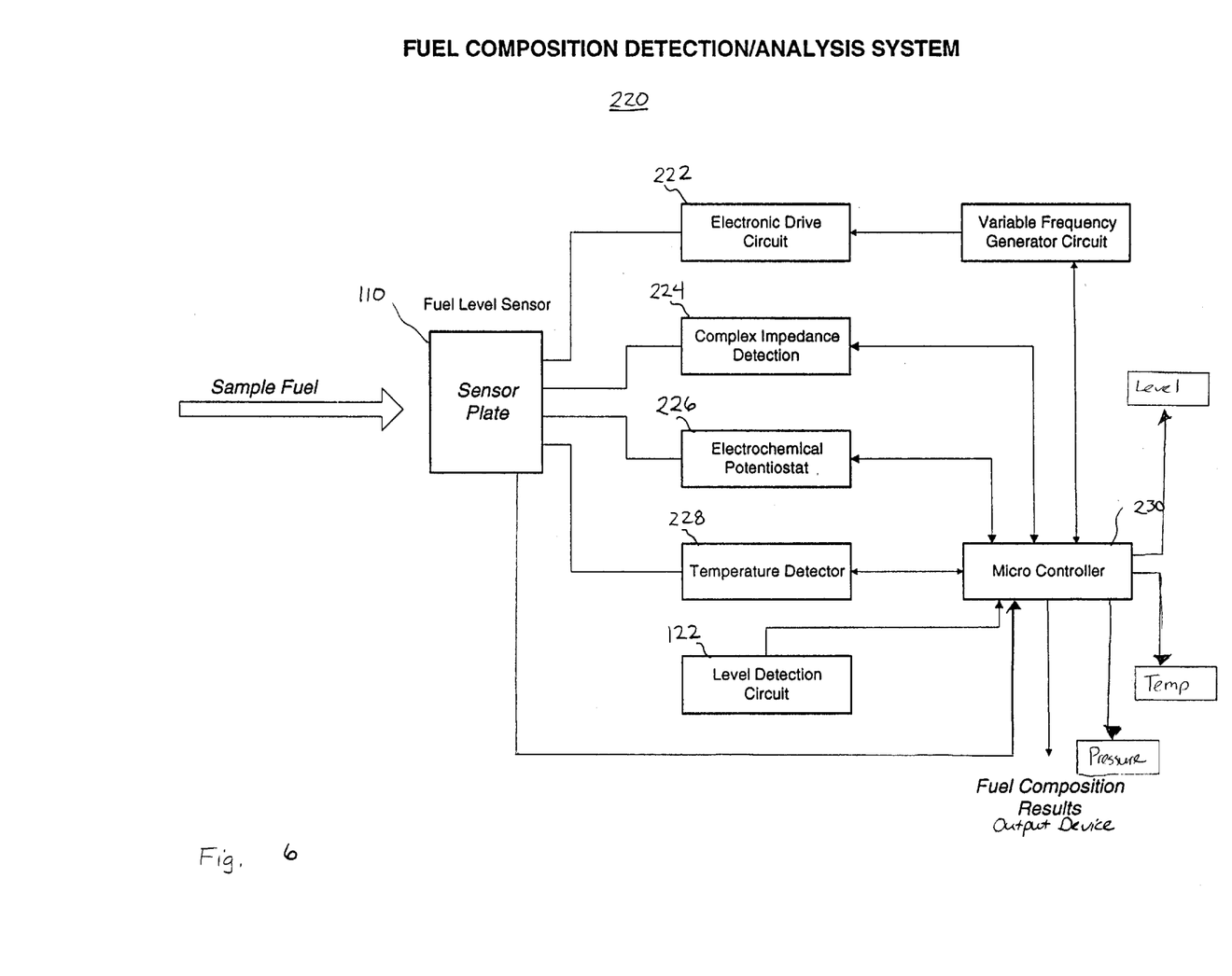
FIG. 6 a block diagram of an analysis circuit in one embodiment of the fuel system.

FIG. 6 is a block diagram of an exemplary embodiment of a fuel composition analysis circuit 220. In one embodiment, circuit 220 is also mounted or embedded on substrate 114. Analysis circuit 220 includes an electronic drive circuit 222, a complex impedance detection circuit 224, an electrochemical potentiostat 226, and a temperature detector 228, such as a thermistor, all connected in parallel, each receiving an input signal from the bottom-most pair of sensors 110 on substrate 114, and each providing an output signal to a microcontroller 230.

Microcontroller 230 can be, for example, an 8 bit or 16 bit chip as commonly commercially available. Microcontroller 230 also receives direct input from signal detection circuit 122. Complex impedance detection circuit 224 detects the impedance and dielectric value from the interaction of the sensor pair with the fuel. Microcontroller 230 provides a variable frequency electronic signal to the sensor pair and samples at a controlled rate across a specific frequency range. Electrochemical potentiostat 226 generates an electrochemical response in the fuel being tested, and the electrochemical reactivity is sampled at a controlled rate. The outputs of complex impedance detection circuit 224 and electrochemical potentiostat 226 are combined at microcontroller 230 for analysis of the chemical composition of the fuel. Analysis circuit 220 is thus configured to sense the chemical composition of the fuel by combining complex impedance measurements with other information such as temperature information, or to sense a change in the dielectric of the fuel as the concentration of a particular component of the fuel varies. The circuit is configured to sense, for example, the alcohol, water or octane concentration in gasoline or the layering of one liquid over another such as, for example, oil over water.

Figure 7:
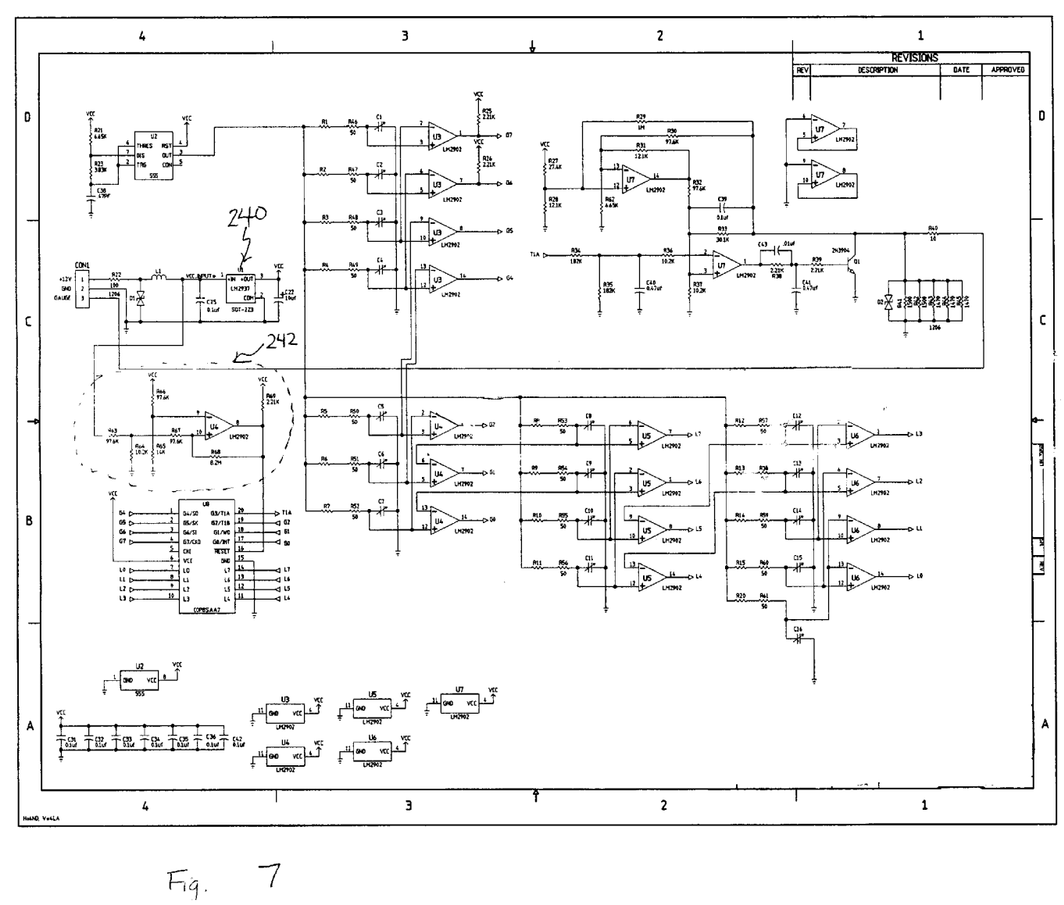
FIG. 7 is a schematic diagram of a first exemplary embodiment of the fuel system.

FIG. 7 is a schematic diagram showing the circuitry of a first exemplary embodiment of fuel system 100. As shown in FIG. 7, fuel system 100 includes the multiple sensor pairs as capacitors C1 through C16, coupled to OpAmps U3, U4, U5 and U6 configured as comparators within signal detection circuits 122. A voltage regulator 240 provides power for the PWM microprocessor U8.

In one embodiment, fuel system 100 includes a reset circuit 242 to insure that system 100, or more specifically the microprocessor in PWM circuit 203, reinitializes properly on power up, or after power failures or brown outs when a voltage drops below a preset level. In one embodiment, the reset circuit includes an OpAmp as a comparator for analyzing the incoming source power with the resulting output of voltage regulator 240 that is used to provide the power to the microprocessor. The reset circuit further includes a voltage divider to create an offset between the source power and the output of the voltage regulator. As the source power increases and approaches the level needed for proper operation, the inputs to the comparator switch polarity causing the output of the comparator to switch. This in turn causes the microprocessor to reset and begin executing once the source power has exceeded a set level. The level is typically set at a point that will insure proper operation of the microprocessor.

Figure 8:
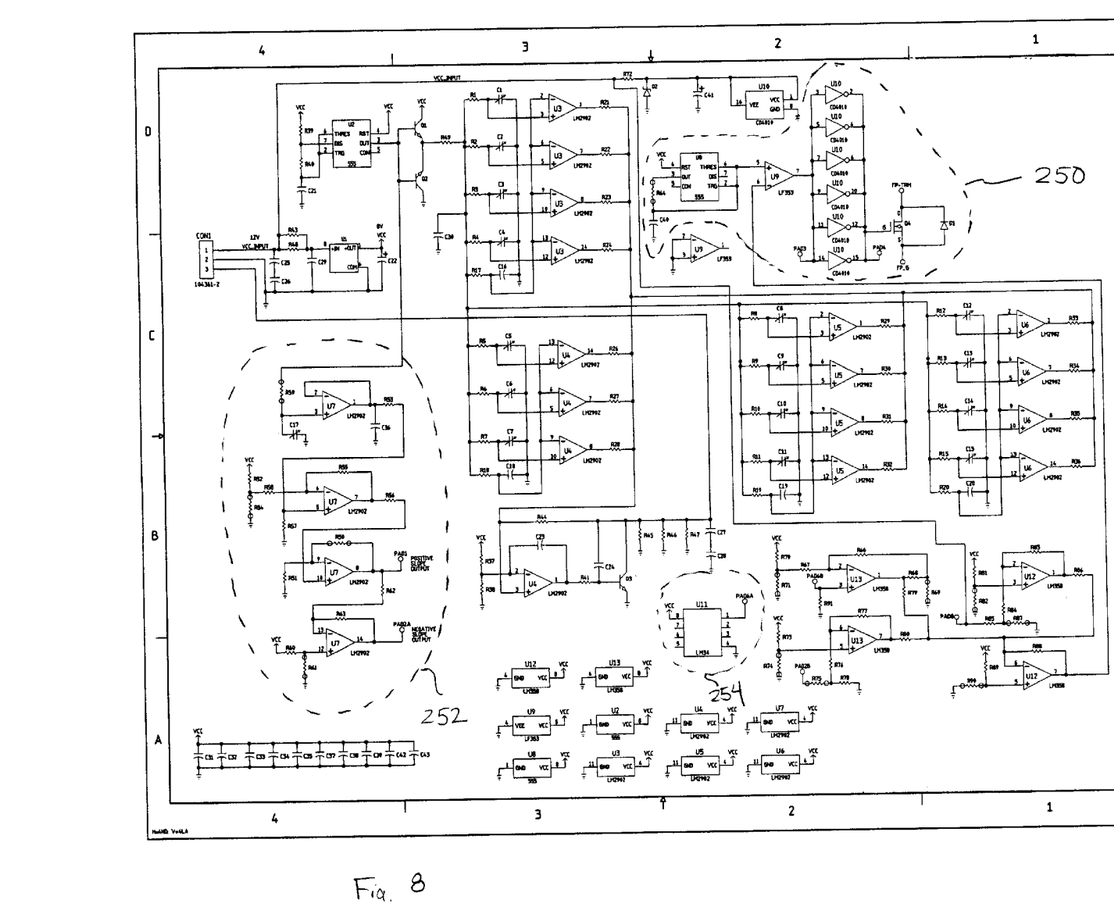
FIG. 8 is a schematic diagram of a second exemplary embodiment of the fuel system.

FIG. 8 is a schematic diagram showing the circuitry of a second exemplary embodiment of fuel system 100. The second exemplary embodiment includes circuitry for controlling the fuel pump speed while also compensating for temperature and composition, and particularly alcohol content, of the fuel. Specifically, this embodiment includes, in addition to the elements described above in FIG. 7, a fuel pump speed control circuit 250, with inputs from a fuel composition circuit 252 including its own capacitive sensor C17, and a temperature sensor U11 in a temperature sensing circuit 254. Thus, fuel pump speed control circuit 250 uses fuel composition information provided by composition circuit 252, as well as temperature information from temperature sensing circuit 254, to adjust the speed of a vehicle fuel pump accordingly.

In an exemplary embodiment, dielectric substrate 114 is a flexible material in an elongated rectangular shape which extends from the bottom to the top of a tank; however, depending on the shape of the tank, other substrate shapes may be chosen. Substrate 114 supports the capacitive sensor arrays 112 and 116 in a known fixed relationship with respect to tank 104, and is fabricated from a flexible material such as, for example, polyimide or the like. A portion of the flexible substrate is made substantially rigid, and the electronic components portion of the circuit positioned on the rigid portion. The sensor portion of the electronic circuit is positioned on substrate 114 on flexible portions. The flexible substrate 114 allows fuel system to substantially conform to the shape of, for example, any fuel tank or fuel delivery module. For example, fuel system with a flexible substrate 114 can be mounted in a tank by being directly attached to an outer surface of a fuel delivery module. Alternatively, fuel system 100 can be embedded directly onto the outer layer of a fuel delivery module. In this embodiment, an inner layer of the fuel delivery module is a ground plane, and fuel system, as a flexible circuit as described above, is embedded on an external surface of the fuel delivery module. In other alternative embodiments, substrate 114 may be a rigid material such as, for example, conventional circuit board material, ceramic, fiberglass, KAPTON, or other plastic, or the like.

In one embodiment, fuel system 100 is coated with a conformal coating to thereby seal and electrically insulate the components thereof from the fluids encountered during operation. The coating material is chosen from among known protective coating materials having low dielectric constants, such as, for example, paralene, polyimide, or polyamideimide. The coating is applied by known coating methodology, such as for example by spraying or by dipping. In one embodiment, the edges of the PC board are impregnated with a wicking or absorbing material, so that any voids in the coating are filled. The wicking or absorbing material provides further protection for the components of indicator 100.

Figure 3:
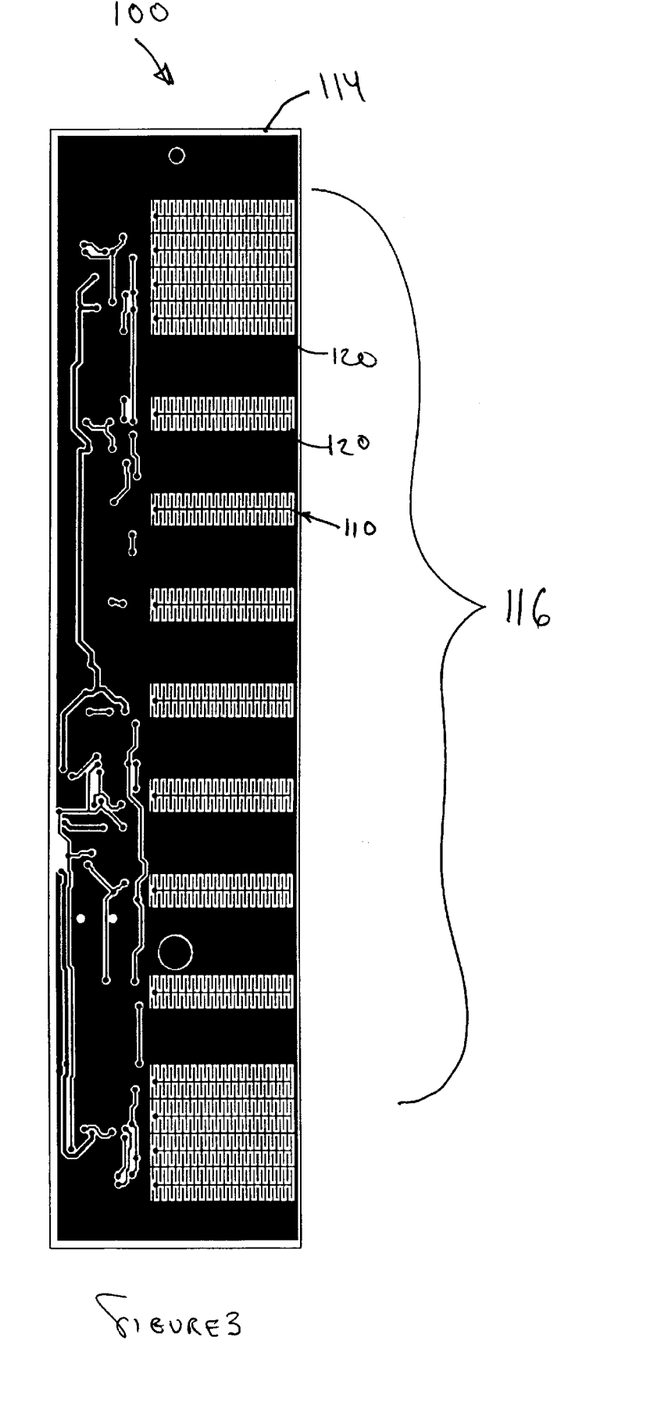
FIG. 3 is a plan view of a rear surface of the fuel system.

In operation, the capacitive liquid level indicator is placed into a vehicle fuel tank so that the capacitive sensors are arranged from bottom to top thereof. The vehicle may be an automobile, boat, motorcycle or other motorized vehicle using liquid fuel such as, for example, gasoline. While in one embodiment, as shown in FIGS. 2 and 3, the capacitive sensor array has a vertical orientation (i.e. orthonormal to horizontal), alternatively the substrate can be placed at a preselected acute angle with respect to horizontal. The tank is then filled with fuel, wherein some or all sensors are submerged in the fuel and a corresponding number of sensor signal detection circuits 122 are also submerged. The electronics of the capacitive liquid level indicator are activated, wherein the oscillator circuit causes sensor and reference capacitors to periodically charge and discharge at a rate preferably faster than the gain band width of the comparators. Those capacitive sensors inside the liquid have a sufficiently higher capacitance which affect an RC bridge included in each signal detection circuit 122 such that a comparator connected thereto is in the on state. However, as the fuel level falls, those capacitive sensor pairs which emerge from the fuel have a reduced capacitance which affects the RC bridge such that the comparator connected thereto switches to the off state. As long as the bottom-most sensor pair is submerged in fuel, fuel composition analysis circuit 220 also provides a chemical analysis of the fuel. More specifically, circuit 220 provides a vehicle operator with an octane content of a gasoline, an alcohol content of a flex-fuel, and a water content of a fuel. When the bottom-most sensor pair is not submerged in a fuel, indicating that tank 104 is empty, a fuel level signal from signal detection circuit 122 will prevent circuit 220 from operating.

Because both temperature and fuel composition have significant effects on fuel pump flow rate, the capability of the fuel system to provide a platform for electronic control of fuel pump speed is especially useful. The Pulse Width Modulation of fuel pump voltage as described above reduces fuel pump current draw, and therby reduces load on the alternator. The PWM control also improves fuel pump durability, fuel economy, fuel tank temperature, fuel pump noise, and evaporative emissions. Further, the PWM control of fuel pump speed is believed to be highly cost competitive when compared to currently known systems.

In addition, the availability of the substrate for mounting of additional components provides the basis for adding yet other electronic functions to the fuel system. For example, in alternative embodiments, additional electronic components include, a separate temperature sensor, a hydrophone for sensing motion of the liquid, and a pressure sensor. For example, a pressure sensor is added to sense pressure changes to detect leakage from the fuel tank. Such additional components are mounted or embedded in the substrate.

The fuel system is thus a passive device which provides a range of information on the properties and conditions of a liquid fuel in a tank, including fuel level, fuel composition and quality, internal tank pressure, fuel temperature, and fuel movement while the car is unoccupied. Specifically, the fuel system provides information on the chemical composition and thus quality of the fuel, including the water content, octane level of a gasoline, and ethanol content of a flex-fuel. In one embodiment, the fuel level signal is damped as desired to provide a damped signal to the fuel indicator or gauge.

The fuel system further provides output signals to actuate or control other vehicle devices in response to changes in the fuel or the tank. In addition, the fuel system supports the inclusion of an on-vehicle fiber-optic communications bus, allowing for communications internal to the vehicle. Such an embedded communications bus is less heavy and costly than the wire harnesses typically in current use for on-vehicle communications. Still further, those skilled in the art will recognize that a wide range of additional electronically subserved functions are supported by the fuel system. For example, in alternative embodiments, the fuel system includes circuitry supporting roll-over detection for shutting off fuel delivery in case of a roll-over, or circuitry supporting motion detection which is coupled to an on-board vehicle security system. It is also to be understood that while in one embodiment the sensor capacitors are configured as inter-digitated straight, finger-like plates, any suitable capacitor configuration may be substituted therefor, such as for example round plates, spiral plates, or other geometrically shaped plates.

In addition, the overall size and shape of capacitive liquid level fuel system 100 can of course be varied to accommodate the size and shape of a fuel tank of a particular vehicle or class of vehicles. Thus, fuel system 100 also embodies a method for compensating for variations in tank geometry when measuring fluid level within a tank. The method includes, for example, providing the passive fluid level sensor for placement within the tank, wherein the passive fluid level sensor includes a microprocessor. The microprocessor is configured to calibrate fluid level outputs according to tank configuration constants that vary with tank configuration, wherein the microprocessor has been provided with the tank configuration constants that correspond to the configuration of the tank in which fluid level is being measured.

While the invention has been described in terms of various specific embodiments, those skilled in the art will recognize that the invention can be practiced with modification within the spirit and scope of the claims.

What is claimed is:

1. A self-compensating fuel sensing system comprising:
    a dual array of a plurality of capacitive sensors on a dielectric substrate, said dual array of capacitive sensors forming a plurality of sensor pairs; wherein said capacitive sensors comprise a plurality of interdigitated fingers arranged substantially vertically with respect to said fuel;
    a plurality of signal detection circuits, each of said signal detection circuits coupled to a first sensor pair and a second sensor pair, said signal detection circuits each comprising comparators configured to compare the capacitance of said first sensor pair with the capacitance of said second sensor pair; and
    a signal conditioning circuit coupled to said comparator circuit, said signal conditioning circuit configured to receive the outputs of said comparator circuits and further configured to drive a plurality of output devices.

2. A self-compensating fuel sensing system in accordance with claim 1 wherein said dual array comprises a first sensor array, said first sensor array affixed to a front surface of said dielectric substrate, and a second sensor array, said second sensor array affixed to a rear surface of said dielectric substrate.

3. A self-compensating fuel sensing system in accordance with claim 2 wherein said first sensor array and said second sensor array are superposed with respect to one another, said plurality of sensor pairs each comprising a first capacitive sensor from said first sensor array and a second capacitive sensor from said second sensor array, wherein said first capacitive sensor and said second capacitive sensor are superposed with respect to one another.

4. A self-compensating fluid sensing system in accordance with claim 1 wherein said first sensor pair and said second sensor pair are coupled in parallel by one of said plurality of signal detection circuits.

5. A self-compensating fluid sensing system in accordance with claim 1 wherein said plurality of sensor pairs comprise at least two sensor pairs, each sensor pair corresponding to a discrete fluid level output.

6. A self-compensating fluid sensing system in accordance with claim 5 wherein said plurality of sensor pairs comprise sixteen sensor pairs.

7. A self-compensating fuel sensing system in accordance with claim 1 wherein said first sensor pair and said second sensor pair are positioned adjacent one another.

8. A self-compensating fuel sensing system in accordance with claim 1 wherein said first sensor pair and said second sensor pair are positioned in staggered relation relative to one another so that at least one third sensor pair is positioned between said first sensor pair and said second sensor pair.

9. A self-compensating fluid sensing system in accordance with claim 1 further comprising a signal conditioning circuit, said plurality of signal detection circuits each configured to send an output to said signal conditioning circuit.

10. A self-compensating fuel sensing system in accordance with claim 1 wherein said signal conditioning circuit is configured to drive a plurality of output devices, said plurality of output devices comprising at least an analog fuel gauge.

11. A fuel sensing system comprising:
    a plurality of capacitive sensors on a dielectric substrate, said capacitive sensors forming a plurality of sensor pairs; wherein said capacitive sensors comprise a plurality of interdigitated fingers arranged substantially vertically with respect to said fuel;
    a plurality of comparator circuits, each of said comparator circuits coupled to a first sensor pair and a second sensor pair and configured to compare the capacitance of said first sensor pair with the capacitance of said second sensor pair; and
    a signal conditioning circuit coupled to said comparator circuits, said signal conditioning circuit configured to receive the outputs of said comparator circuits and further configured to drive a plurality of output devices.

12. A fuel sensing system in accordance with claim 11 further comprising the plurality of output devices.

13. A fuel sensing system in accordance with claim 12 wherein said plurality of output devices comprises a fuel pump speed control circuit.

14. A fuel sensing system in accordance with claim 12 wherein said plurality of output devices comprises a fuel composition analysis circuit.

15. A fuel sensing system in accordance with claim 14 further comprising a microcontroller, and said fuel composition analysis circuit comprising: an electronic drive circuit, a complex impedance detection circuit, an electrochemical potentiostat and a temperature detector coupled in parallel, each configured to receive an input from a designated sensor pair and to provide an output to said microcontroller, said microcontroller configured to analyze the chemical composition of a fuel in contact with said fluid level sensor.

16. A fuel sensing system in accordance with claim 15, said fuel composition analysis circuit configured for signaling an alcohol content of the fuel.

17. A fuel sensing system in accordance with claim 16, said fuel composition analysis circuit configured for signaling an ethanol content of the fuel.

18. A fuel sensing system in accordance with claim 15, said fuel composition analysis circuit configured for signaling a water content of the fuel.

19. A fuel sensing system in accordance with claim 15, said fuel composition analysis circuit configured for signaling an octane rating of the fuel.

20. A method for compensating for variations in tank geometry in measuring of fluid level within a tank, said method comprising:
providing a self-compensating fuel sensing system for placement within the tank, the self-compensating fuel sensing system including a microprocessor,
configuring the microprocessor to calibrate fluid level outputs according to tank configuration; and
providing the microprocessor with tank configuration constants that correspond to the configuration of the tank in which fluid level is being measured;
wherein the self-compensating fuel sensing system comprises:
a dual array of a plurality of capacitive sensors on a dielectric substrate, said dual array of capacitive sensors forming a plurality of sensor pairs; wherein said capacitive sensors comprise a plurality of interdigitated fingers arranged substantially vertically with respect to said fuel;
a plurality of signal detection circuits, each of said signal detection circuits coupled to a first sensor pair and a second pair, said signal detection circuits each comprising comparators configured to compare the capacitance of said first sensor pair with the capacitance of said second sensor pair; and
a signal conditioning circuit coupled to said comparator circuit, said signal conditioning circuit configured to receive the outputs of said comparator circuits and further configured to drive a plurality of output devices.

21. A self-compensating fuel sensing system in accordance with claim 1 wherein said signal conditioning circuit is configured to sense liquid temperature and provide an output representative of the temperature of said liquid to cause adjustment of at least one adjustable parameter of a fuel pump.

22. A self-compensating fuel sensing system in accordance with claim 1 wherein said signal conditioning circuit is configured to sense tank pressure and provide an output representative of the pressure of said tank to cause adjustment of at least one adjustable parameter of a fuel pump.

23. A self-compensating fuel sensing system in accordance with claim 1 wherein said signal conditioning circuit is configured to sense fuel composition and provide an output representative of the composition of said fuel to cause adjustment of at least one adjustable parameter of a fuel pump.

24. A self-compensating fuel sensing system in accordance with claim 1 wherein said signal conditioning circuit is configured to sense current from the fuel pump motor and provide an output representative of the current of said fuel pump motor to cause adjustment of at least one adjustable parameter of a fuel pump.

25. A self-compensating fuel sensing system in accordance with claim 1 wherein said signal conditioning circuit is configured to sense voltage from the engine controller and provide an output representative of the voltage of said engine controller to cause adjustment of at least one adjustable parameter of a fuel pump.

26. The self-compensating fuel sensing system in accordance with claim 23 wherein said fuel composition comprises alcohol content of the fuel.

27. The self-compensating fuel sensing system in accordance with claim 23 wherein said fuel composition comprises ethanol content of the fuel.

28. The self-compensating fuel sensing system in accordance with claim 23 wherein said fuel composition comprises water content of the fuel.

29. The self-compensating fuel sensing system in accordance with claim 23 wherein said fuel composition comprises octane rating of the fuel.

* * * * *